UNITED STATES PATENT OFFICE.

LEOPOLD GLEICHMAR, OF RUDOLSTADT, GERMANY.

COMPOSITION OF MATTER ESPECIALLY ADAPTED FOR USE IN MANUFACTURING BUILDING-BLOCKS.

SPECIFICATION forming part of Letters Patent No. 644,765, dated March 6, 1900.

Application filed January 2, 1900. Serial No. 135. (No specimens.)

*To all whom it may concern:*

Be it known that I, LEOPOLD GLEICHMAR, a subject of the German Emperor, residing at Rudolstadt, Germany, have invented certain new and useful Improvements in a Composition of Matter Especially Adapted for Use in the Manufacture of Building-Blocks, of which the following is a specification.

In producing the composition embodying my invention I take two parts of crude linseed-oil, two parts of castor-oil, (Ricinus oil,) and one-half part of rosin. These ingredients are melted together in a steam-pot, and I then add to the mixture sufficient pulverized marble to bring the mixture to the consistency of a thin paste. The mixture is then boiled for six hours and cooled or allowed to cool. When the mixture has cooled, I stir in pulverized marble and sand of equal parts until the mass has assumed the form of a loose powder. This powder may be pressed in suitable forms into building-blocks.

I employ castor-oil for the purpose of giving the blocks great toughness, so as to prevent the corners and edges of the blocks from breaking off easily and to neutralize the disagreeable odor that results when linseed-oil alone is used. Linseed-oil and castor-oil produce, with the marble-dust, a putty-like substance. The marble-dust is employed for the purpose of giving the stones a soft appearance. The stones may also be polished, which polish is increased by the addition of rosin.

Having described my invention, what I claim, and desire to secure by Letters Patent, is—

A composition of matter suitable for the manufacture of building-blocks consisting of linseed-oil, castor-oil, rosin and a thickening ingredient of a granular or sandy character, as specified.

LEOPOLD GLEICHMAR.

Witnesses:
CARL PETZULER,
RUDOLPH FRICKE.